United States Patent [19]

Castarede

[11] Patent Number: 4,651,629
[45] Date of Patent: Mar. 24, 1987

[54] PISTON OF REFRACTORY MATERIALS, PARTICULARLY FOR COMPRESSION-IGNITION ENGINES

[75] Inventor: Armand Castarede, Meudon La Foret, France

[73] Assignee: Regie Nationale Des Usines Renault, Billancourt, France

[21] Appl. No.: 607,119

[22] Filed: May 3, 1984

[30] Foreign Application Priority Data

May 5, 1983 [FR] France ................. 83 07524

[51] Int. Cl.$^4$ .................................................. F16J 1/00
[52] U.S. Cl. .................................... 92/176; 92/212; 92/220; 92/224; 92/239; 92/248; 92/255; 123/193 P
[58] Field of Search ............. 92/173, 176, 215, 216, 92/220, 222, 239, 248, 255, 256, 257, 258, 259, 212; 123/193 P

[56] References Cited

U.S. PATENT DOCUMENTS

| | | | |
|---|---|---|---|
| 1,089,823 | 3/1914 | Day et al. | 92/220 |
| 1,494,483 | 5/1924 | Howe | 92/212 |
| 1,572,325 | 2/1926 | Smith | 92/220 |
| 2,059,713 | 11/1936 | Schneider | 92/212 X |
| 3,173,345 | 3/1965 | Thompson | 92/239 |
| 3,959,974 | 6/1976 | Thomas | 92/176 |
| 4,243,621 | 1/1981 | Mori et al. | 264/65 |
| 4,433,616 | 2/1984 | Hauser, Jr. | 92/220 |

FOREIGN PATENT DOCUMENTS

| | | | |
|---|---|---|---|
| 2938018 | 4/1981 | Fed. Rep. of Germany | 123/193 P |
| 1086351 | 2/1955 | France | 92/176 |

Primary Examiner—Edward K. Look
Attorney, Agent, or Firm—Oblon, Fisher, Spivak, McClelland & Maier

[57] ABSTRACT

A piston (2) is of refractory materials, particularly for a compression-ignition engine of the type having a head (4), a skirt (6) and their mutual fastening means. According to the invention, this skirt (6) is formed entirely of a refractory material and has two semicylindrical parts (18, 20) each of which has ribs (22) and a semispherical cavity (36, 38). After assembly, the cavities form a ball joint seat for the small end of a piston rod along a plane containing the longitudinal axis (14) of the piston (2). Application is to compression-ignition engines with high efficiency.

9 Claims, 4 Drawing Figures

PISTON OF REFRACTORY MATERIALS, PARTICULARLY FOR COMPRESSION-IGNITION ENGINES

BACKGROUND OF THE INVENTION

1. Field of the Invention

This invention relates to a piston of refractory materials, used in an internal combustion engine and more particularly in a compression-ignition engine.

2. Description of the Prior Art

In the design of compression-ignition engines, it has been proposed to use insulated combustion chambers to increase efficiency and reduce pollution. Moreover, the available heat to drive the turbine of a turbocharged engine is thereby considerably increased. A known solution consists of spraying a ceramic-base insulating material on the surfaces of the combustion chamber.

Another common solution is to form at least one of the components that define the combustion chamber of an insulating material. As a variant, a ceramic insert can be embedded in one of these components or a thermal shield can be added.

In the first solution, difficulties arise in maintaining the integrity of the insulating layer because of the stresses due to the combustion cycle and consequently because of the problems of thermal expansion.

With these solutions, difficulties also arise which are caused by the considerable temperature gradients existing between the materials. Excessive thermal stresses and deformations can result when a material which does not have an extremely low coefficient of thermal expansion is involved.

SUMMARY OF THE INVENTION

The above problems are solved by the invention whose object is a piston of refractory materials, particularly for a compression-ignition engine of the type having a head, a skirt and mutual fastening means therefor.

The invention proposes a more reliable, lighter and more adiabatic piston than those traditionally made of aluminum alloy or cast iron. These three properties contribute to the improvement of the thermodynamic and mechanical efficiency of compression-ignition engines and to the reduction of vibration and noise levels thereof.

According to a feature of the invention, the skirt of the piston, formed entirely of refractory material, has two semicyclindrical parts each of which has ribs and a semispherical cavity and, after assembly, form a ball joint seat for the small end of the piston rod. The assembly of the skirt halves is along a plane containing the longitudinal axis of the piston. Each part of the skirt defines a very rigid structure due to the formation of ribs thereon. The skirt is simple in shape which makes production easy. Replacement of the traditional piston pin with a ball joint allows the use of fragile materials, reduces reciprocating masses and is particularly well suited to the operation of a two-stroke engine.

According to another feature of the invention, the piston head, formed entirely of refractory material, defines a combustion chamber and recesses distributed around the longitudinal axis of the piston and opening on the lower face of the connection to the skirt. This head has a simple, light structure, and its recesses enhance the necessary thermal insulation between it and the piston skirt, which is already promoted by the use of a refractory material.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
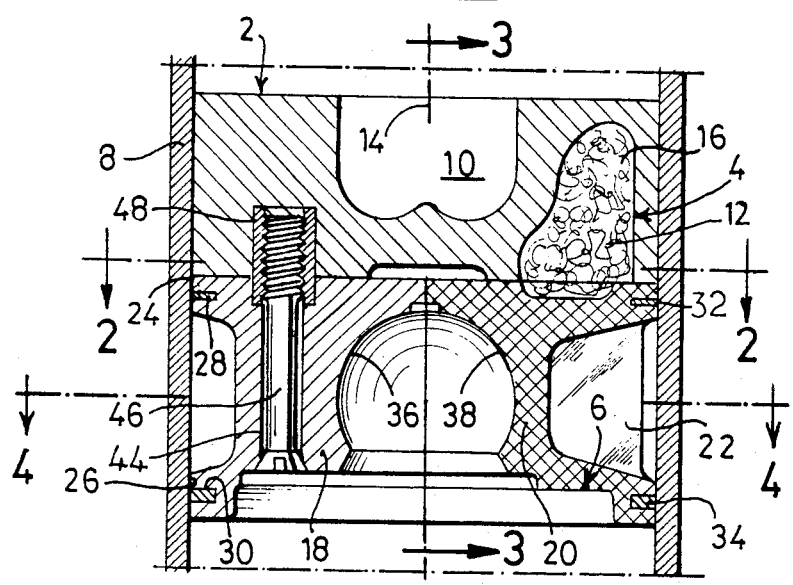
FIG. 1 is a view in longitudinal axial section of a piston according to the invention.
Figure 2:
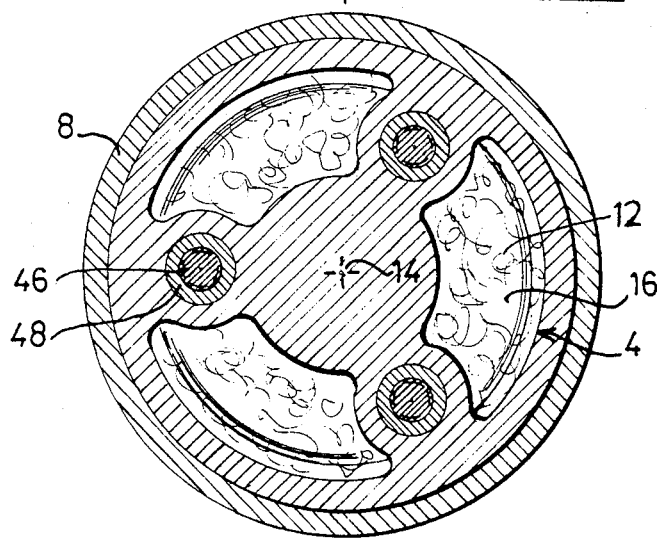
FIG. 2 is a view in section along line 2—2 of FIG. 1.
Figure 3:
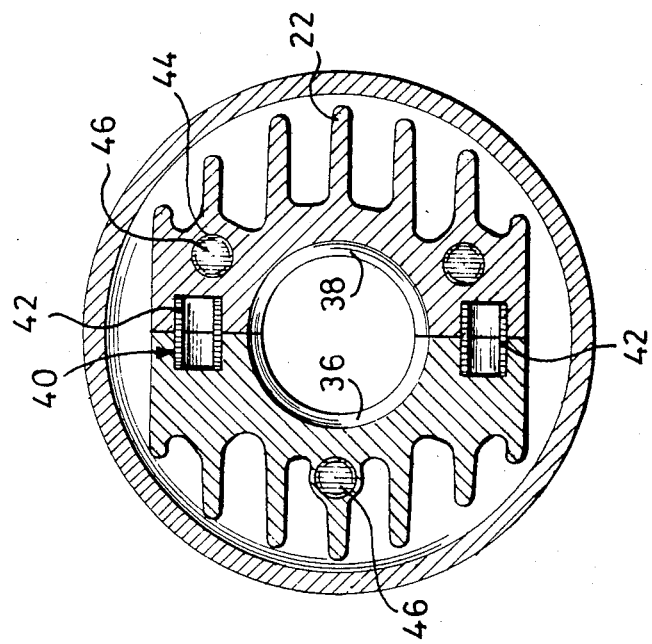
FIG. 3 is a view in section along line 3—3 of FIG. 1.
Figure 4:
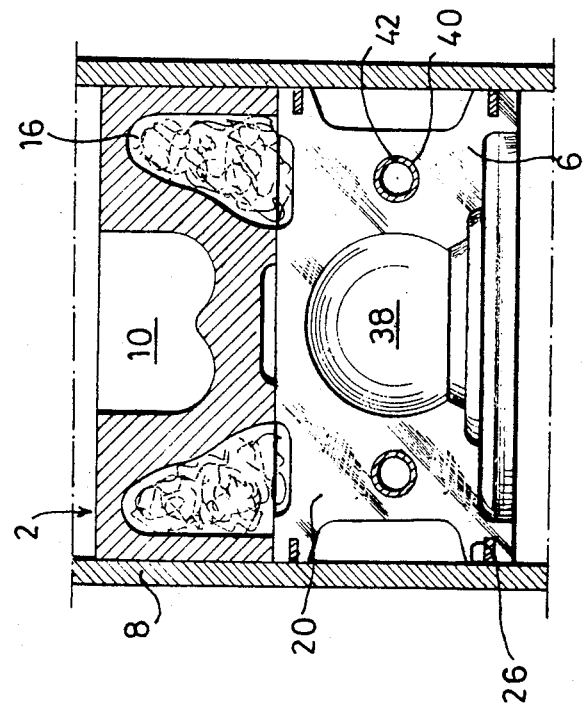
FIG. 4 is a view in section along line 4—4 of FIG. 1.

FIGS. 1 to 4 show a piston 2 for a compression-ignition, direct-injection engine, which has a head 4 and a skirt 6. This piston slides reciprocally in a liner 8 and includes a standard combustion chamber 10 and three recesses 12 regularly distributed around longitudinal axis 14 of the piston and chamber 10. These recesses 12 open on the lower face of the head 4 for connection with skirt 6 and contain an insulating product 16 such as glass wool. Skirt 6 consists of two semicylindrical parts 18 and 20 which are assembled along a plane containing the longitudinal axis 14 of piston 2. Each of these parts 18 and 20 has vertical ribs 22 extending perpendicular to the plane of assembly of the two skirt parts 18 and 20 and located between the upper cylindrical portion 24 and lower cylindrical portion 26 of the skirt 6. These cylindrical portions 24 and 26 respectively have grooves 28 and 30 which respectively receive a piston ring 32 and an oil ring 34.

Skirt parts 18 and 20 include semispherical cavities 36 and 38 respectively which, after assembly, form a ball joint seat for the small end of the piston rod (not shown). Each of these skirt parts is provided with two blind holes 40 whose axes are perpendicular to the plane of assembly of the skirt parts and symmetrical in relation to longitudinal axis 14 of piston 2. These holes 40 are intended to receive two ground centering rings 42.

Three bores 44 with axes parallel to the longitudinal axis 14 of piston 2 and regularly distributed at 120° around this axis go through skirt 6 (one and two bores 44, respectively, for skirt parts 18 and 20). Each of these bores receives a fastening screw 46 and a threaded insert 48 forming a nut and centering ring for the skirt on head 4, in which it is embedded. Piston 2, described above and made of refractory materials such as various ceramics, can operate at very high temperature to improve combustion and the thermodynamic and mechanical efficiency of the engine.

The use of these materials, as a function of the physical and mechanical characteristics thereof and their mode of production, led to designing the piston in an unusual shape.

Actually, head 4 of piston 2 includes recesses 12 in addition to combustion chamber 10 in the case of a direct-injection engine. Skirt 6, assembled from two ribbed parts 18 and 20, covers a spherical small end of the piston rod and has a section suitable for liner 8 or the cylinder in which it is to move.

The refractory material used for the head, Sialon for example, should have very small thermal expansion and conduction coefficients and a good compression strength.

The refractory material used for the skirt should have similar favorable characteristics with respect to good bending strength and a low friction coefficient, for example, silicon nitride.

For a piston made in this way to function properly, liner 8 or the cylinder in which it moves should also be made of refractory material, for example, silicon carbide.

The play between the piston head 4 and liner 8 or the cylinder is thus minimized and as constant as possible during the various phases of running the engine.

Head 4 can also have expansion grooves intended to improve its fluid tightness to the combustion gases. Before the head is assembled on piston skirt 6, the recesses 12, with which the head is provided, can be lined with an insulating product, for example glass wool, to increase the thermal insulating effect provided by the air trapped between the head and the skirt.

Skirt 6, like head 4, must meet the same thermal expansion criteria in regard to liner 8 or the cylinder. Its bearing surface is as small as possible and, if the friction coefficient and lubrication allow it, elements 28, 30, 32 and 34 will be eliminated.

The constituent parts (head and skirt) of piston 2 are fabricated using a mode of production suitable for the refractory materials used. They form a light unit, particularly suited to diesel engines with direct injection (combustion chamber in the piston).

Head 4, whose temperature is high, promotes combustion and cold starting.

In the case of the Ricardo type indirect-injection diesel engines, the head is obviously reduced, even eliminated; the two skirt parts 18 and 20 are then assembled together and the height of the skirt is increased toward the compression face.

This head 4 receives threaded inserts 48 which serve for centering it on skirt 6 and connecting it to the latter by fastening screw 46. Skirt 6, made up of two parts 18 and 20 which, after assembly, are centered on each other, forms a spherical cavity 36, 38 in which a piston rod small end (not shown) pivots. A pressurized oil supply coming from the rod assures its good functioning.

Skirt 6, thus defined, can exhibit a small height thanks to the friction qualities of the refractory materials used and suitable lubrication. Its rocking and cold slapping can be minimized by the slight operating play which is made possible by use of a liner 8 or a cylinder of a material whose thermal expansion coefficient is suited to that of skirt 6. Of course, in the case of engines operating on two strokes and with equicurrent scavenging, the height of skirt 6 is governed by the position of the intake and exhaust ports.

In the two segments which form the skirt, piston ring 32 and oil ring 34 can be eliminated depending on the qualities of the refractory materials used to make the unit consisting of skirt 6, liner 8 or the cylinder, and head 4.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A piston comprising:
    a cylindrical piston head formed entirely of a refractory material having low coefficients of thermal expansion and conduction, said piston head having a longitudinal axis and first and second end faces;
    a combustion chamber formed by a recess in said first end face of said piston head;
    a plurality of recesses circumferentially distributed about said longitudinal axis of said piston head and opening on said second end face of said piston head;
    a cylindrical piston skirt formed entirely of refractory material having low coefficients of thermal expansion and conduction, said piston head having a longitudinal axis and first and second end faces;
    means for coaxially securing said second piston head face and said first piston skirt face to one another;
    a plurality of ribs formed on a peripheral surface of said skirt; and
    a spherical cavity in said piston skirt, said spherical cavity intersecting said skirt longitudinal axis and opening on said second end face of said skirt, whereby said spherical cavity may receive a small end of a piston rod,
    wherein said piston skirt is formed of two semi-cylindrical skirt halves assembled into said skirt at mutually contacting surfaces defining a plane containing said skirt axis, each of said skirt halves including said ribs and a semi-spherical half of said spherical cavity.

2. The piston of claim 1 including means for assembling said skirt halves into said piston skirt, wherein said means for coaxially securing said second piston head face and said first piston skirt face comprise:
    first bores in said skirt and head and extending coaxial with said longitudinal axes;
    a threaded insert in each of said first bores;
    a fastening screw in each of said first bores, each said fastening screw being threaded to one of said inserts;
    wherein said means for assembling comprise:
    said means for coaxially securing said second piston head face and said first piston skirt face;
    second bores in each of said skirt halves and extending transverse to said longitudinal axes; and
    centering rings in said bores, each centering ring crossing said plane.

3. The piston of claim 1 or 2 including thermally insulating fiberous material filling each of said recesses in said piston head.

4. The piston of claim 1 or 2 wherein said piston head is made entirely of a material having good compression strength.

5. The piston of claim 4 wherein said piston head is formed entirely of sialon ceramic material.

6. The piston of claim 1 or 2 wherein said piston skirt is made entirely of a material having a low coefficient of friction, and having good compression and bending strength.

7. The piston of claim 6 wherein said piston skirt is formed entirely of silicon nitride ceramic material.

8. The piston of claim 1 or 2 wherein said piston skirt has a smooth peripheral surface lacking a sectioning groove.

9. The piston of claim 1 or 2 wherein said peripheral surface is an external peripheral surface.

* * * * *